W. L. PADDON.
SLEIGH CARRIER.
APPLICATION FILED APR. 14, 1919.
1,339,861.
Patented May 11, 1920.
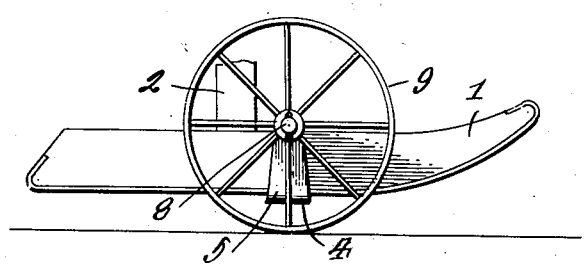
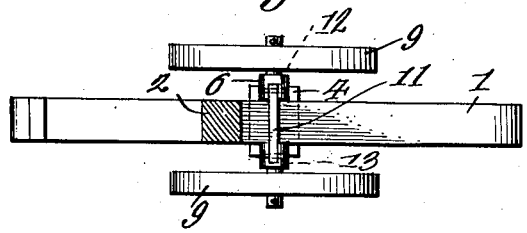
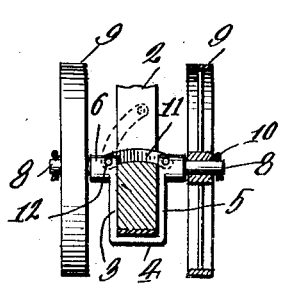 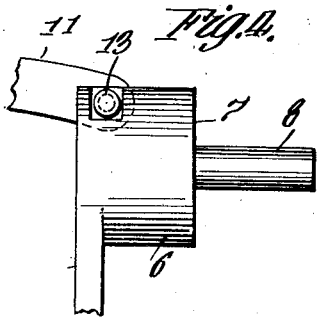
Witnesses
Guy M. Spring
D. J. Garvey
Inventor
Wadham L. Paddon
By Richard B. Owen
Attorney

UNITED STATES PATENT OFFICE.

WADHAM LOCKE PADDON, OF GOSPORT, ENGLAND.

SLEIGH-CARRIER.

1,339,861.   Specification of Letters Patent.   Patented May 11, 1920.

Application filed April 14, 1919. Serial No. 289,771.

*To all whom it may concern:*

Be it known that I, WADHAM L. PADDON, a subject of the King of Great Britain, residing at Gosport, in the county of Hampshire, England, have invented certain new and useful Improvements in Sleigh-Carriers, of which the following is a specification.

This invention relates to carriers for sleigh runners, having for an object the provision of a wheeled support engageable with the runners, to elevate them from the road of travel, when their use has been rendered impractical by the melting of the snow or ice.

Another object is to provide a very simple wheeled frame for engagement beneath each runner, permitting the sleigh to be transported in its entirety.

Other objects of the invention will be in part described and part understood from the following description taken in conjunction with the drawings, wherein:—

Figure 1 is a side elevational view of my device illustrating the application of the same.

Fig. 2 is a top plan view of the device illustrating its application.

Fig. 3 is an end elevational view showing one of the wheels in section and a portion of a sled runner being associated with the device to illustrate the application of the same, the runner being shown in cross section, and Fig. 4 is a detail enlarged fragmentary view showing to advantage the manner in which the locking link is associated with one side of the frame.

In the drawings in order to illustrate the application of my invention, a sled runner 1 is illustrated, which may be of the usual or any desired form, and in this instance is equipped with a portion of a vertical upright 2.

My improved carrier consists of a U-shaped frame generally designated 3, the base 4 of which is relatively broad and flat for engagement beneath the sled runner 1. The sides 5 of the frame have their upper ends equipped with circular enlargements extended laterally so as to lie at right angles to said sides and are abruptly reduced to provide shoulders 7. The reduced portions 8 provide axles upon which wheels 9 are mounted and retained from displacement by means of cotter pins 10 or any other suitable fastening means.

A locking link 11 is used for retaining the runner 1 from displacement in the frame, this link being preferably of an arcuate configuration having one end pivotally mounted as indicated at 12, in one of the enlargements 6, the opposite end being deposited in a complemental opening in the opposite enlargement 6 and being detachably engaged therein by a bolt 13, the head of the latter being preferably countersunk as shown to advantage in Fig. 4.

In the use of this invention, it will in most cases be found expedient to first place the frame 3 beneath the sled runner, locking the same in position through the instrumentality of the lever 11, then placing the wheels on the axles 8 and securing them in the manner specified.

It is to be understood, that minor changes in the details of construction, proportion and arrangement of parts may be made without departing from the spirit and scope of the invention as embodied in the appended claims.

I claim:—

1. A sleigh carrier including a U-shaped frame adapted to receive a runner, the terminals of said frame being turned at right angles and equipped with wheels, and a locking lever pivotally mounted in one side of the frame and detachably engaged with the opposite side of the frame, above the sled runner to secure the latter from displacement.

2. A sleigh carrier including a U-shaped frame the base of which is normally in close proximity to the road of travel and adapted to receive a sleigh runner, the upper ends of the U being turned at right angles and enlarged, a locking lever depressed in one of said enlargements and pivotally mounted to permit swinging movement of the same against or away from the top of the sleigh runner, the free ends of said lever adapted to be depressed in a slot in the other enlargement and secured therein to prevent casual displacement of the runner, and wheels mounted on said frame to facilitate transportation of the runner.

In testimony whereof I affix my signature.

WADHAM LOCKE PADDON.